United States Patent
Liu et al.

(10) Patent No.: US 6,498,599 B1
(45) Date of Patent: Dec. 24, 2002

(54) GAME PAD

(75) Inventors: Chi-Lung Liu, Keelung (TW); Ming-Hui Wu, Taipei Hsien (TW)

(73) Assignee: Kye Systems Corp., Taipei Hsien (TW)

( * ) Notice: Subject to any disclaimer, the term of this patent is extended or adjusted under 35 U.S.C. 154(b) by 0 days.

(21) Appl. No.: 09/535,508

(22) Filed: Mar. 24, 2000

(30) Foreign Application Priority Data

May 19, 1999 (TW) ........................................ 88208030 A

(51) Int. Cl.⁷ ................................................ G09G 5/00
(52) U.S. Cl. ...................... 345/156; 345/160; 345/161; 273/148 B
(58) Field of Search ................................ 345/156, 157, 345/161, 162–164, 160, 167, 168, 173; 273/148 B; 200/548; 137/554; 341/22

(56) References Cited

U.S. PATENT DOCUMENTS

| | | | | |
|---|---|---|---|---|
| 4,870,389 A | * | 9/1989 | Ishiwata et al. | 345/161 |
| 5,293,900 A | * | 3/1994 | Karbassi et al. | 137/554 |
| 5,786,807 A | * | 7/1998 | Couch et al. | 273/148 B |
| 5,813,522 A | * | 9/1998 | Lin | 200/548 |
| 5,864,334 A | * | 1/1999 | Sellers | 345/156 |
| 6,001,015 A | * | 12/1999 | Nishiumi et al. | 345/161 |
| 6,043,806 A | * | 3/2000 | Atwell et al. | 345/161 |
| 6,121,955 A | * | 9/2000 | Liu | 345/161 |
| 6,231,444 B1 | * | 5/2001 | Goto et al. | 273/148 B |
| 6,285,356 B1 | * | 9/2001 | Armstrong | 345/167 |

* cited by examiner

Primary Examiner—Dennis-Doon Chow
(74) Attorney, Agent, or Firm—J.C. Patents

(57) ABSTRACT

A game pad of the present invention is electrically connected to a mainframe through an interface for controlling a game software executed in the mainframe. The game pad includes a scanning circuit electrically which is electrically connected to a central controller, a push-button type direction control circuit, an induction type direction control circuit, a programmable push pad circuit and a gad control circuit. The scanning circuit is controlled by the central controller to scan the above-stated circuits, thereby selecting one of them. The induction type direction control circuit includes a sense device which consists of sensors. According to a relative position with a reference direction, each sensor generates and transmits a direction control signal to the sense device to thereby make the central controller read and scan the moving direction of the sense device. The selecting device is electrically coupled to the central controller for selecting a mode of direction control.

11 Claims, 4 Drawing Sheets

GAME PAD

CROSS-REFERENCE TO RELATED APPLICATION

This application claims the priority benefit of Taiwan application serial no. 88208030, filed May 19, 1999.

BACKGROUND OF THE INVENTION

1. Field of the Invention

The invention relates to a game pad, in particular to a game pad being capable of selecting a mode of direction control, and more particularly to a game pad having a push-button type direction control and an induction type direction control.

2. Description of the Related Art

A game pad which functions as an interface between users and a mainframe is worldwide used for game software on computers or TVs. Through direction control buttons on the game pad, users can control the moving direction of a corresponding character defined by the game software. Furthermore, users can control the option, set, etc. of the game software through function buttons on the game pad. Generally, there are 8-direction control buttons on the game pad for direction control, wherein 4 of the 8-direction control buttons can control a corresponding character to move up, down, right and left, and the other 4-direction control buttons can control the corresponding character to move upper right, upper left, lower right and lower left by pressing two control buttons at the same. Since the actions of characters become faster and faster with the help of a high-frequency microprocessor, using fingers to push the 8-direction control buttons can not be fast enough to control a corresponding character to move.

Additionally, there is another improved way for direction control called an induction type direction control. Using a sensor built in a game pad, the movements of the game pad controlled by users can be detected. In other word, the sensor can detect the movements of the game pad so as to move a specified character to a corresponding direction. However, this induction type direction control belongs to an electronic control. That is, in addition to the sensor, there must be a complicated control circuit to thereby achieve the purpose of direction control. Therefore, in this case, a high-cost electronic sensor is used and a complicated peripheral circuit is needed to cooperate with the electronic sensor, resulting in a weaker competition.

SUMMARY OF THE INVENTION

The invention is to provide a game pad which uses a sensor and a mechanical roller to attain the purpose of direction control, thereby simplifying the complicated circuit of the conventional induction type direction control.

The invention is to provide a game pad having 8-direction control buttons and a function of induction type direction control. Therefore, users can appropriately select one of the above stated modes for direction control.

The invention is to provide a game pad having a display circuit for displaying a mode currently selected by users.

A game pad according to the present invention is electrically coupled to a mainframe through an interface for controlling a game software executed in the mainframe. The game pad includes a central controller, an induction type direction control circuit, a push-button type direction control circuit, a programmable push pad circuit, a speed control circuit, a scanning circuit and a selecting device. The scanning circuit is electrically connected to the central controller, the push-button type direction control circuit, the induction type direction control circuit, the programmable push pad circuit and the speed control circuit. The scanning circuit is controlled by the central controller so as to scan the above-described circuits to thereby select one thereof.

The induction type direction control circuit has a sense device, a 2D sensor. According to a relative position between the sensor and a reference direction, a direction control signal is generated and transmitted to the sensor to thereby make the central processor read and scan the moving direction of the scan sensor.

The selecting device is electrically coupled to the central controller. According to the on/off state of the selecting device, one of the induction type direction control circuit and the push pad direction control circuit is activated by the central controller, thereby selecting a mode of direction control.

BRIEF DESCRIPTION OF THE DRAWINGS

The invention will become more fully understood from the detailed description given hereinbelow and the accompanying drawings which are given by way of illustration only, and thus do not limit the present invention, and wherein.

DETAILED DESCRIPTION OF THE PREFERRED EMBODIMENTS

Figure 1:
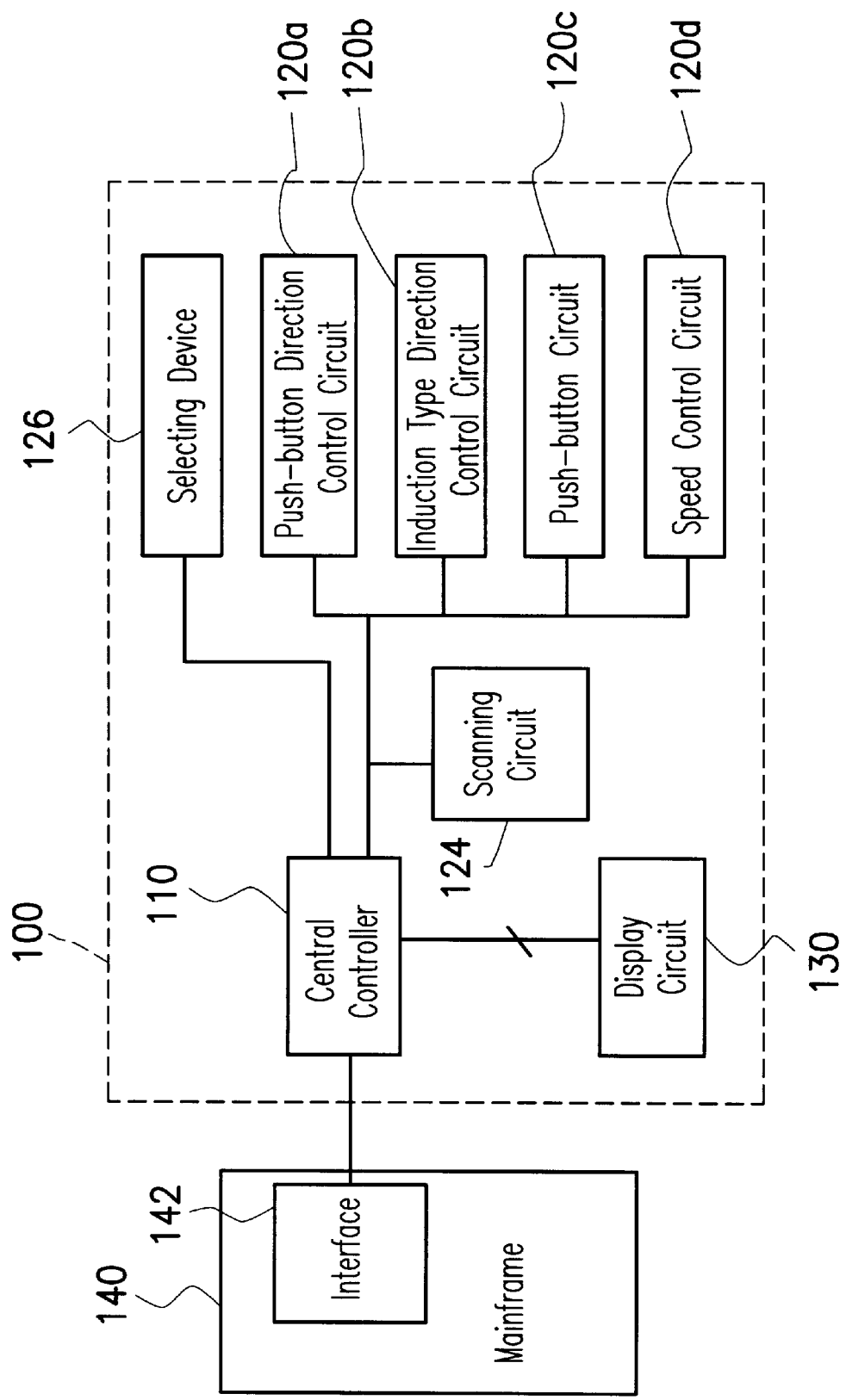
FIG. 1 is a block diagram showing a game pad according to the present invention.

Referring to FIG. 1, a block diagram of a game pad 100 according to the invention is shown. The game pad 100 is electrically connected to a mainframe 140 through an interface 142 for controlling a game software executed in the mainframe 140. The game pad 100 includes a central controller 110, a push-button type direction control circuit 120a, an induction type direction control circuit 120b, a programmable push pad circuit 120c, a speed control circuit 120d, a scanning circuit 124 and a selecting device 126.

The central controller 110 is used to control the operation of the entire game pad. The induction type direction control circuit 120b is electrically coupled to the central controller 110. The induction type direction control circuit 120b includes a sense device 200. According to a relative position between the game pad 100 and a reference direction, the sense device 200 can generate and transmit a short-circuit signal corresponding to the relative position to the sensor of the induction type direction control circuit 120b. According to the short-circuit signal, the induction type direction control circuit 120b can make the central controller 110 generate a second direction control signal corresponding to the relative position. The second direction control signal is further transmitted to the mainframe 140 through the interface 142 to thereby move a specified character defined by the game software to a corresponding direction. The scanning circuit 124 is electrically coupled to the central controller 110, the push-button type direction control circuit 120a, the induction type direction control circuit 120b, the programmable push pad circuit 120c and the speed control circuit 120d.

The scanning circuit 124 is controlled by the central controller 110 to scan the push-button type direction control circuit 120a, the induction type direction control circuit 120b, the programmable push pad circuit 120c and the speed control circuit 120d, and then select one of them.

The push-button type direction control circuit 120a is electrically coupled to the central controller 110. The push-button type direction control circuit 120a includes a plurality of buttons. When one of the buttons is pushed (electrically conducted), the central controller 110 generates a corresponding first direction control signal. The first direction control signal is transmitted to the mainframe 140 through the interface 142 to thereby move a specified character defined by the game software to a corresponding direction.

The selecting device 126 is electrically coupled to the central controller 110. According to the on/off state of the selecting device 126, one of the induction type direction control circuit 120b and the push-button type direction control circuit 120a is activated by the central controller 110, thereby selecting a mode of direction control.

In order to completely achieve the function of the game pad according to the invention, the game pad further includes a programmable push pad circuit 120c electrically coupled to the central controller 110. The programmable push pad circuit 120c includes a plurality of buttons each of which is set through the interface 142 using the game software, thereby making each button have a specific function. The display circuit 130 is electrically coupled to the central controller 110 for displaying a mode of direction control selected by the selecting device 126 and can use a light-emitting LED to display two opposite colors which are corresponding to the push-button type direction control and the induction type direction control, respectively.

Moreover the game pad 100 includes a gad control circuit 120d electrically coupled to the central controller 110. The speed control circuit 120d can be applied on flying simulation software for controlling the throttle valve of a flyer or racing software for speed control. The speed control circuit 120d of the invention includes a sensor SEN3 with a structure different from that of sensors SEN1, SEN2 in FIG. 2. The pins 1, 2 of the sensor SEN 3 are electrically coupled to the pins P03, P02 of a microprocessor U1 through diodes D1, D2. The pin 3 of the sensor SEN3 is electrically coupled to the pin Y3 of a multiplexer U2B of the scanning circuit 124. Therefore, the microprocessor U1 can read and scan the data of the sensor SEN3.

Referring next to FIG. 3, a game pad 100 according to a preferable embodiment of the invention will be described in the following. The game pad 100 has a microprocessor with a USB interface.

Figure 2:
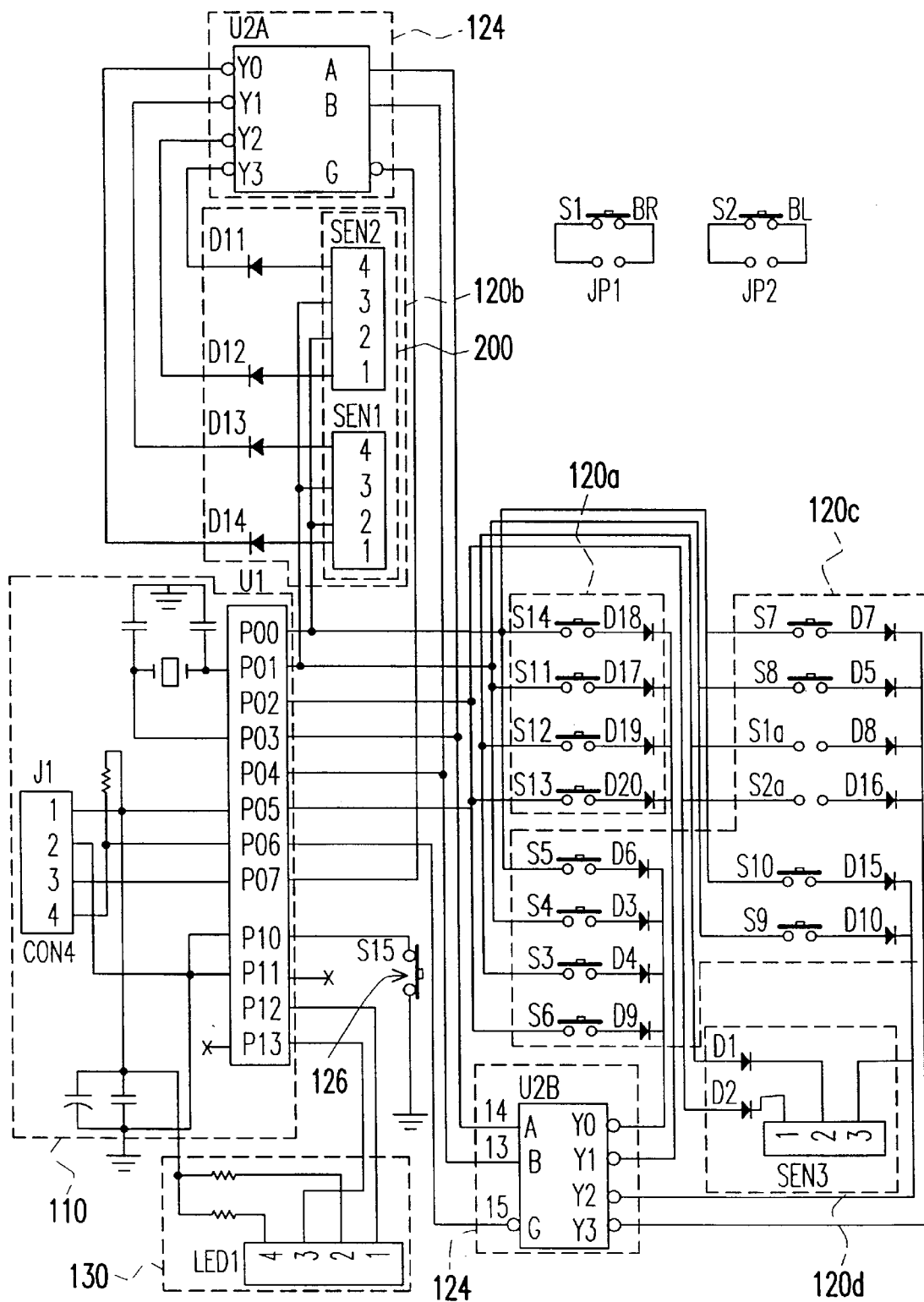
FIG. 2 is a schematic view showing a game pad according to a preferred embodiment of the present invention.

Referring to FIGS. 1, 2, the push-button type direction control circuit 120a is a 8-direction control circuit which includes a plurality of buttons, such as switches S11~S14 which designate up, down, right and left, respectively. Two buttons pressed together can designate upper right, upper left, lower right or lower left. One terminals of the buttons S11~S14 are electrically coupled to the pins Po1, P02, P03 and P00 of the microprocessor U1 (i.e., central controller 110). The other terminals of the switches S11~S14 are electrically coupled to diodes D17, D19, D20, D18, respectively. The cathodes of the diodes D17~D20 are electrically coupled to the pin Y0 of the multiplexer U2B. When the button S11 is pressed, the diode D17 is electrically conducted and then an up-moving signal is transmitted to the microprocessor U1 through the multiplexer U2B. Thereafter, the up-moving signal is further transmitted to the mainframe 140 through the interface 142 to thereby move a specified character defined by the game software up. Similarly, buttons S12~S14 have the same operation. With such push-button type direction control circuit 120a, a function of 8-direction moving can be obtained.

Figure 3A:
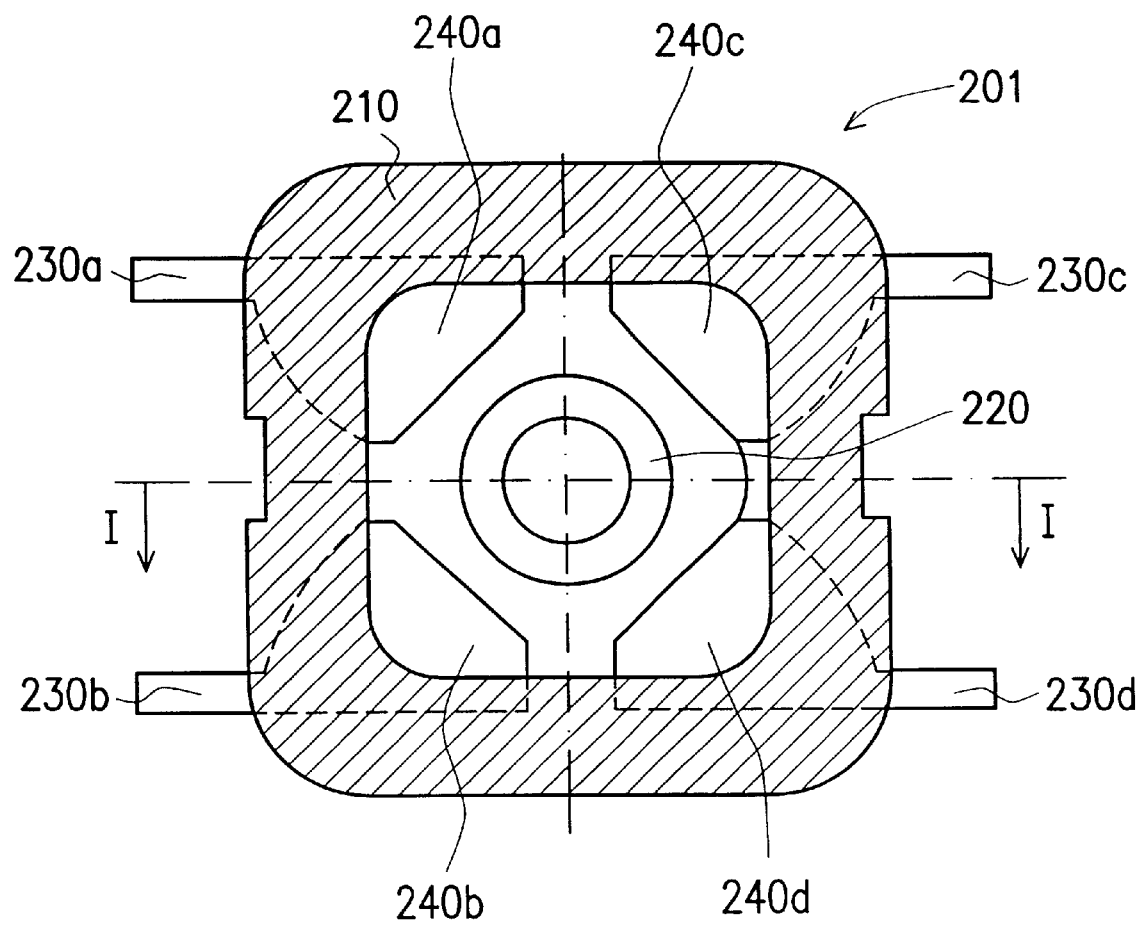
FIG. 3A is a top view of a sensor of a game pad according to a preferred embodiment of the present invention.

Referring to FIG. 3A, the sense device 200 of the induction type direction control circuit 120b comprises two 2D sensors 201. The movements of the game pad 100 can be detected by the two 2D sensors 201 to thereby control the action of a specified character defined by the game software. For example, if the game pad is moved towards the right side, a specified character will move towards the right side. As shown in FIG. 2, the pins 2, 3 of the sensor SEN1 are electrically coupled to the pins P00, P01 of the microprocessor U1. The pins 1, 4 of the sensor SEN1 are electrically coupled to the pins YO, Y1 of the multiplexer U2A through diodes D13, D14, respectively. The pins 2, 3 of the sensor SEN2 are electrically coupled to the pins P00, P01 of the microprocessor U1, respectively. The pins 1, 4 of the sensor SEN2 are electrically coupled to the pins Y2, Y3 of the multiplexer U2A through the diodes D11, D12, respectively.

As shown in FIG. 3A, a top view of the sensor 201 for achieving the purpose of the induction type direction control according to the invention is shown. The sensor 201 includes a roller 220 located in a case 210. The sensor 201 has four electrical pins 230a, 230b, 230c, 230d. The electrical pins 230a~230d extends to the inside of the sensor 201 to serve as the terminals 240a~240d of the roller 220.

Figure 3B:
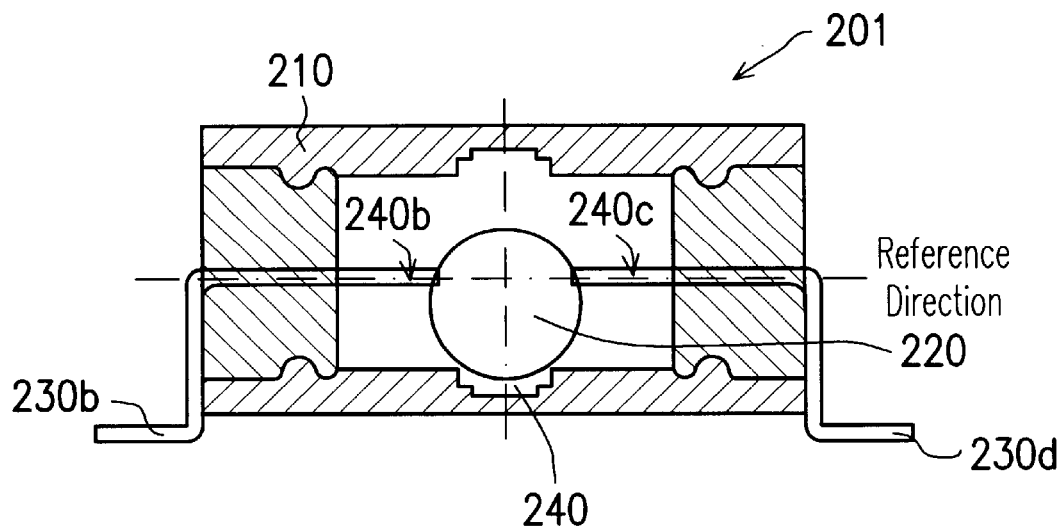
FIG. 3B is a cross-sectional view of FIG. 3A along a line of I—I.
Figure 3C:
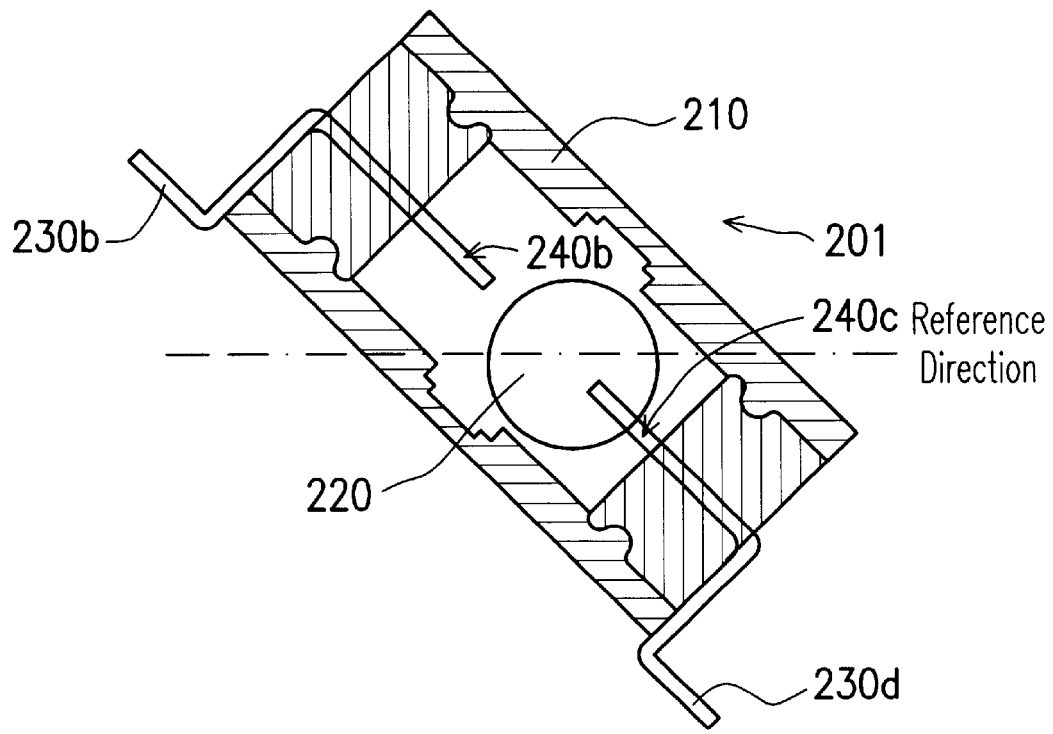
FIG. 3C is a schematic view showing a sensor for control.

FIG. 3B is a cross-sectional view of FIG. 3A along a line I—I. When the sensor is horizontally placed, the roller 220 is steadily located in a shallow groove 240, thereby preventing the roller 220 from rolling. Moreover, the roller 220 keeps an equivalent distance from the terminals 240a~240d. The sensor 201 is electrically coupled to the other sensor 201 through the electrical pins 230a, 230b, 230c, 230d. As shown in FIG. 3C, the sensor 201 deviates from a reference direction. Under this circumstance, the roller 220 is electrically coupled to the terminals 240c, 240d so as to make terminals 240c, 240d and the roller 220 at a state of short-circuit. Therefore, a signal on a declined side (for example, a right side) is transmitted to the sense device 200 to make the diodes D11, D12 or D13, D14 be electrically conducted. As a result, the microprocessor U1 can read and scan the moving direction of the sense device 200. After that, the signal is further transmitted from the microprocessor U1 to the mainframe 140 through the interface 142, thereby making a specified character defined by the game software executed in the mainframe move up.

With the two sensors 201 described above, induction type direction control can be achieved by a simple control circuit. Since it is unnecessary to have a complicated control circuit, the cost of the game pad 100 can be greatly reduced.

As can be seen from the above, the game pad 100 of the present invention has a first and a second control circuit 120a, 120b for a traditional 8-direction push-button type direction control and an induction type direction control, respectively. Users can select a mode of push-button type direction control or induction type direction control through the selecting device 126, such as a button switch S15, according to their own requirements. The button switch S15 is electrically coupled to the pin P10 of the microprocessor U1. By turning on or off the button switch S15, the microprocessor U1 can select the push-button type direction control circuit 120a or an induction type direction control circuit 120b.

Furthermore, in order to let users know what is a current direction control mode, the game pad 100 includes a display circuit 130. As shown in FIG. 2, the display circuit 130 includes a light-emitting diode LED1. The light-emitting diode LED1 is electrically coupled to the pins P12, P13 of the microprocessor U1. When users select a mode of push-button type direction control (or induction type direction control), the microprocessor U1 can control the light-emitting diode LED1 of the display circuit 130 to emit a corresponding light according to the on/off state of the button switch S15. For example, a green light represents a mode of push-button type direction control while an orange light represents a mode of induction type direction control.

Additionally, the game pad 100 includes a programmable push pad circuit 120c having a plurality of switches, such as button switches S3~S8, S9~S10, S1a, S2a. As shown in FIG. 2, one terminals of the button switches S3~S6 are electrically coupled to the pins P00~P03 of the microprocessor U1. One terminals of the button switches S7, S8, S1a, S2a are electrically coupled to the pins P00~P03 of the microprocessor U1. One terminals of the button switches S9, S1O are electrically coupled to the pins P00, P01 of the microprocessor U1. The other terminals of the button switches S3~S6 are electrically coupled to the anodes of the diodes D4, D3, D6, D9. The cathodes of the diodes D4, D3, D6, D9 are electrically coupled to the pin Y1 of a multiplexer U2B. The other terminals of the button switches S7, S8, S1a, S1b are electrically coupled to the anodes of diodes D7, D5, D8, D16. The cathodes of the diodes D7, D5, D8, D16 are electrically coupled to the pin Y2 of the multiplexer U2B. The other terminals of the button switches S9, S1O are electrically coupled to the anodes of diodes D10, D15. The cathodes of the diodes D10, D15 are electrically coupled to the pin Y3 of the multiplexer U2B.

The function of the above-stated programmable button switches can be set by game software. For example, game software executed in the mainframe can communicate with the microprocessor U1 through the interface 142, thereby setting the function of the button switches S3~S8, S9~S10, S1a, S2a.

After setting is completed, the diode D4 can be electrically conducted when the button switch S3 is pressed. As a result, an on-state signal is transmitted to the multiplexer U2B and then to the microprocessor U1. Subsequently, the microprocessor U1 transmits the on-state signal to the mainframe 140 through the interface 142. Therefore, users can perform several operations, such as item selecting, setting and programming, for the game software executed in the mainframe 140, using the button switch S3. Similarly, the button switches S3~S8, S9~S10, S1a, S2a can have the same operations. Accordingly, operations, such as item selecting, setting and programming, can be performed in the game software, using programmable push pad circuit 120c.

As compared with the prior art, the game pad of the present invention can have the following advantages:

(1) A sensor is used to cooperate with a mechanical roller for direction detect, thereby simplifying the induction type direction control circuit of the prior art. Therefore, the cost on manufacture and design can be greatly reduced, resulting in a stronger competition.

(2) The game pad of the present invention can have the functions of 8-direction control and induction type direction control at the same time. Users can select a proper mode for direction control according to requirements of users or game software.

(3) The game pad of the present invention can further include a display circuit. For example, using a different color of light emitted from a light-emitted diode to represent a mode of direction control selected by users.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A game pad electrically connected to a mainframe through an interface for controlling a game software executed in the mainframe, the game pad comprising:

a central controller for controlling the game pad;

an induction type direction control circuit electrically coupled to the central controller, the induction type direction control circuit having a sense device for generating and transmitting a short-circuit signal corresponding to a relative position to the sense device according to the relative position between the game pad and a reference direction, the induction type direction control circuit making the central controller generate and transmit a first direction control signal corresponding to the relative position to the mainframe through the interface according to the short-circuit signal so as to make a corresponding character defined by the game software move to a direction corresponding to the first direction control signal, wherein the sense device comprises two sensors each having a roller and four electrical pins which extend to the inside of a corresponding sensor, wherein the roller is kept equal distances from the four electrical pins when the sensor is horizontally placed, and the roller is electrically coupled to two of the four electrical pins to thereby generate the short-circuit signal when the sensor is declined;

a push-button type direction control circuit electrically coupled to the central controller, the push-button type direction control circuit having a plurality of buttons, wherein the central controller generates a second direction control signal when a corresponding button is electrically conducted, wherein the second direction control signal is transmitted to the mainframe through the interface to make the character move to a direction corresponding to the second direction control signal;

a programmable push pad circuit electrically the central controller, the programmable push pad circuit having a plurality of button switches on the game pad, wherein the button switches can be set using the game software through the interface to have a specific function; and a selecting device electrically coupled to the central controller, wherein the central controller switches one of the induction type direction control circuit and the push-button type direction control circuit according to the on/off state of the selecting device to thereby select a mode of direction control.

2. The game pad of claim 1, further comprising a speed control circuit electrically coupled to the central controller.

3. The game pad of claim 2, further comprising a scanner circuit which is controlled by the central controller to scan and then select one of the induction type direction control circuit, the push pad direction control circuit, the programmable push pad circuit and the speed control circuit.

4. The game pad of claim 1, further comprising a display circuit electrically coupled to the central controller for displaying a mode of direction control which is selected by the selecting device.

5. The game pad of claim 4, wherein the display circuit has a light-emitting diode which can generate two different colors of lights corresponding to two modes of the push-button type direction control and the induction type direction control, respectively by means of a control signal of the central controller.

6. The game pad of claim 1, wherein the central controller has a microprocessor with a universal serial bus (USB) interface.

7. The game pad of claim 6, wherein the interface is a USB specification of interface.

8. The game pad of claim 1, wherein the central controller has a microprocessor with a serial interface.

9. The game pad of claim 1, wherein the interface is a serial specification of interface.

10. The game pad of claim 1, wherein the selecting device is a button switch.

11. The game pad of claim 1, wherein the roller is steadily placed in a shallow groove.

* * * * *